United States Patent
Imanishi

(10) Patent No.: US 10,243,231 B2
(45) Date of Patent: Mar. 26, 2019

(54) FUEL CELL UNIT

(71) Applicant: TOYOTA JIDOSHA KABUSHIKI KAISHA, Aichi-ken (JP)

(72) Inventor: Masahiro Imanishi, Gotenba (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 37 days.

(21) Appl. No.: 15/604,487

(22) Filed: May 24, 2017

(65) Prior Publication Data
US 2017/0358813 A1    Dec. 14, 2017

(30) Foreign Application Priority Data
Jun. 13, 2016 (JP) ................ 2016-117001

(51) Int. Cl.
*H01M 8/2475* (2016.01)
*H01M 8/04* (2016.01)
*H01M 8/24* (2016.01)

(52) U.S. Cl.
CPC .......... *H01M 8/2475* (2013.01); *H01M 8/04* (2013.01); *H01M 8/24* (2013.01)

(58) Field of Classification Search
CPC .................. H01M 8/2475; H01M 8/04
See application file for complete search history.

(56) References Cited

U.S. PATENT DOCUMENTS

| 2006/0240297 A1* | 10/2006 | Takeda .......... H01M 8/04007 429/431 |
| 2016/0133968 A1 | 5/2016 | Shirakawa et al. |
| 2016/0231391 A1 | 8/2016 | Katano et al. |

FOREIGN PATENT DOCUMENTS

| CN | 1855594 A | 11/2006 | |
| CN | 105164840 A | 12/2015 | |
| JP | 2004-127778 A | 4/2004 | |
| JP | 2006-236902 A | 9/2006 | |
| JP | 2006-302629 A | 11/2006 | |
| JP | 2008198358 A * | 8/2008 | ............... H01H 9/26 |

* cited by examiner

*Primary Examiner* — Ula C Ruddock
*Assistant Examiner* — Thomas H. Parsons
(74) *Attorney, Agent, or Firm* — Dickinson Wright, PLLC

(57) ABSTRACT

The fuel cell unit comprises a fuel cell including a cell stack with a plurality of stacked cells; a cell monitor which monitors one or more of the plurality of stacked cells; a control device connected with the cell monitor via a communication cable; a first case which places the fuel cell therein; and a second case which places the control device therein and fixed to an upper surface of the first case. The cell monitor includes a connector portion protruded from the first case and provided with a connection connector which is connected with a communication connector of the communication cable. The second case includes an insertion space for receiving the connector portion when the second case is fixed to the first case and further includes a connector opening in a surface opposed to the connection connector when the connector portion is inserted in the insertion space.

3 Claims, 4 Drawing Sheets

FUEL CELL UNIT

CROSS-REFERENCE TO RELATED APPLICATIONS

The present application claims priority from Japanese patent application 2016-117001 filed on Jun. 13, 2016, the entirety of the content of which is hereby incorporated by reference into this application.

BACKGROUND

Field

The present disclosure relates to a fuel cell unit.

Related Art

JP 2014-216088A describes a fuel cell unit configured to include a fuel cell stack (hereinafter also simply called "fuel cell"), a cell monitor fixed to the fuel cell and a cable arranged to establish communication between the cell monitor and a vehicle-mounted ECU (Electronic Control Unit).

The control device configured to establish communication with the cell monitor of the above fuel cell unit is provided outside of the fuel cell unit. The cable used to connect the cell monitor with the control device is accordingly required to have high waterproof property. This leads to a problem of an increase in the device cost.

In order to reduce the requirement for the high waterproof property of the cable arranged to connect the cell monitor with the control device, the inventors have employed a configuration that the control device provided to establish communication with the cell monitor is placed inside of a housing of the fuel cell unit. For example, in a possible configuration that the fuel cell and the control device are placed in one identical case and that the control device is fixed to inside of a cover provided to cover over an opening formed in an upper surface of the case, however, there is a need to connect the cell monitor with the control device by a cable before the cover is mounted to the case. This configuration accordingly provides a problem of difficulty in assembling. Another possible configuration may fix the control device relative to the fuel cell, like the cell monitor. This configuration relieves the problem of difficulty in assembling but is likely to cause adverse effects, for example, insufficient fixation of the control device, due to stresses by thermal expansion and thermal contraction of the fuel cell accompanied with power generation of the fuel cell.

SUMMARY

According to one aspect of the disclosure, there is provided a fuel cell unit. This fuel cell unit comprises a fuel cell including a cell stack with a plurality of stacked cells; a cell monitor configured to monitor one or more of the plurality of stacked cells; a control device connected with the cell monitor via a communication cable; a first case configured to place the fuel cell therein; and a second case configured to place the control device therein and fixed to an upper surface of the first case. The cell monitor includes a connector portion protruded from the first case and provided with a connection connector configured to be connected with a communication connector of the communication cable. The second case includes an insertion space for receiving the connector portion inserted therein in a state that the second case is fixed to the first case and further includes a connector opening in a surface opposed to the connection connector in a state that the connector portion is inserted in the insertion space.

DETAILED DESCRIPTION

Figure 1:
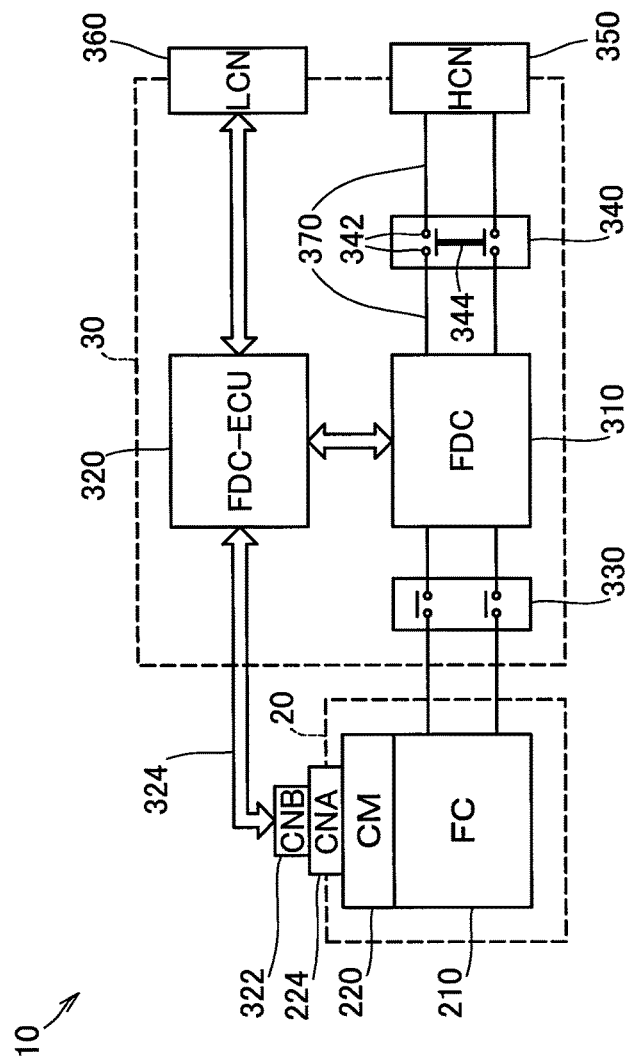
FIG. 1 is a block diagram illustrating the configuration of a fuel cell unit according to one embodiment of the disclosure.

FIG. 1 is a block diagram illustrating the configuration of a fuel cell unit 10 according to one embodiment of the disclosure. The fuel cell unit 10 may be used for, for example, a fuel cell system mounted on a moving body such as a fuel cell vehicle or a stationary fuel cell system. The fuel cell unit 10 is configured to include a fuel cell portion 20 and a high voltage circuit portion 30. The fuel cell portion 20 includes a fuel cell 210 configured to include a cell stack provided by stacking a plurality of cells, and a cell monitor 220 configured to monitor the voltages of the respective cells. The high voltage circuit portion 30 includes an FC converter 310 configured as a DC-DC converter to boost an output voltage of the fuel cell 210, and a control device 320 configured to control the FC converter 310. The high voltage circuit portion 30 also includes an output connector 350 and an external communication connector 360. The output connector 350 is a connector configured to be connected with an output cable that is provided to supply an output of the FC converter 310 to a load device (not shown) (for example, an inverter configured to drive a motor that serves as a power source of the fuel cell vehicle). The external communication connector 360 is a connector configured to be connected with an external communication cable that is provided to establish communication between the control device 320 and, for example, another control device (not shown) mounted on the fuel cell vehicle. A relay 330 is provided between an output terminal of the fuel cell 210 and an input terminal of the FC converter 310. A communication cable 324 provided with a communication connector 322 is connected with the control device 320. The cell monitor 220 is provided with a connection connector 224 that is configured to be connected with the communication connector 322. The control device 320 and the cell monitor 220 are connected to establish communication with each other via the communication cable 324, the communication connector 322 and the connection connector 224. A service plug unit 340 is provided in an output wiring 370 arranged between the output of the FC converter 310 and the output connector 350 and is configured to cut off the output of the voltage of the fuel cell 210 to the outside. The service plug unit 340 is configured to include a socket portion 342 that is connected with the output wiring 370 and a service plug portion 344 detachably mounted to the socket portion 342.

Figure 2:
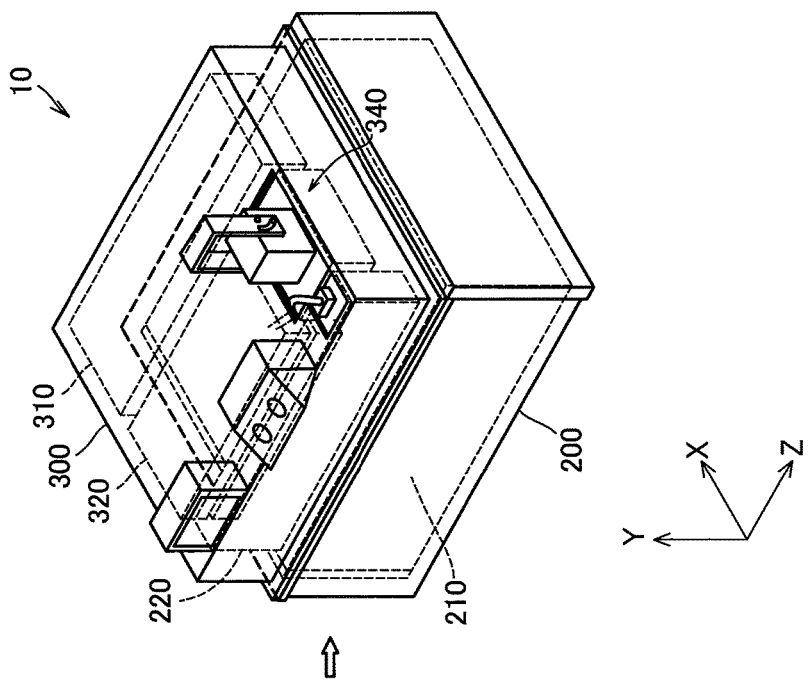
FIG. 2 is perspective views illustrating the configuration of the fuel cell unit.
Figure 2:
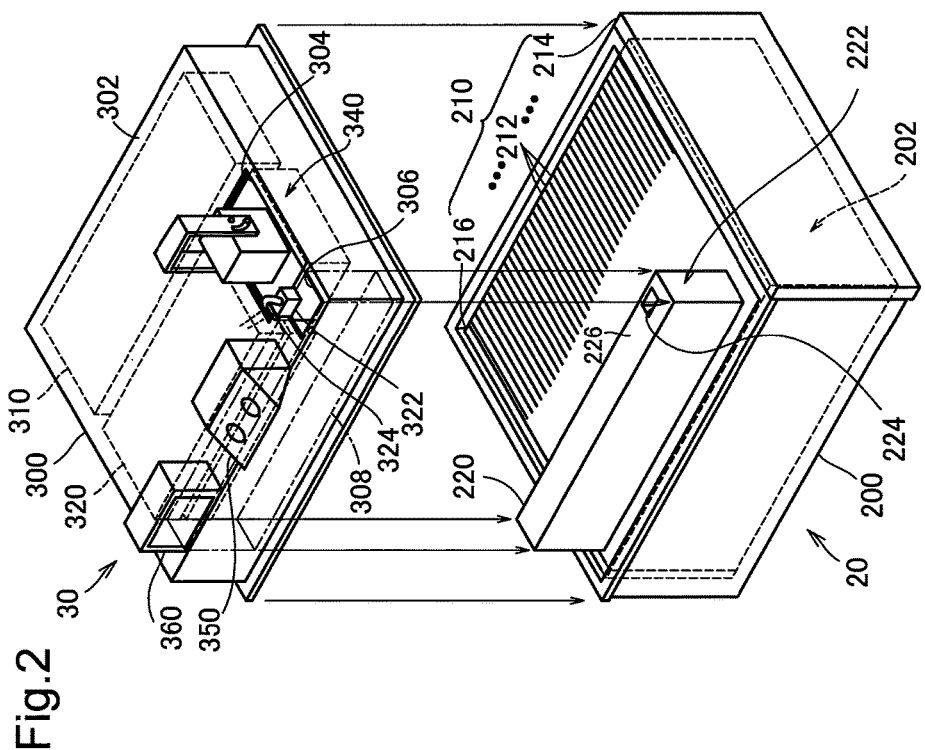

FIG. 2 is perspective views illustrating the configuration of the fuel cell unit 10. In the drawings, an X axis and a Z axis are arranged parallel to a horizontal plane; and a +Y direction indicates a vertically upward direction and a −Y direction indicates a vertically downward direction. The fuel cell unit 10 also includes a first case 200 and a second case 300 that is fixed to an upper surface of the first case 200 and is configured as a cover to cover over the first case 200.

As shown by the left drawing of FIG. 2, the fuel cell 210 of the fuel cell portion 20 is placed in the first case 200, and the cell monitor 220 is fixed to a frame (not shown) on an upper side (+Y direction side) of the fuel cell 210. Monitor terminals of the respective cells 212 of the fuel cell 210 are connected with the cell monitor 220 by means of cables (not shown). A side face opening 202 is provided in a side face on a +Z direction side of the first case 200.

The fuel cell 210 is configured to include a cell stack provided by stacking a plurality of cells 212 along the Z direction. A terminal plate and an insulator (not shown) are provided on both sides of the cell stack. The cell stack and the terminal plates and the insulators provided on the respective sides of the cell stack are placed between a first end plate 214 and a second end plate 216. The fuel cell 210 is inserted into the first case 200 through the side face opening 202 on the +Z direction side of the first case 200 and is fixed to the first case 200 such that the first end plate 214 covers the side face opening 202. The first end plate 214 is provided with supply ports and discharge ports (not shown) configured to be connected with supply pipings and discharge pipings for reactive gases and a cooling medium used for power generation of the fuel cell 210.

The cell monitor 220 fixed on the fuel cell 210 includes a connector portion 222 protruded upward from the first case 200 and is provided with the connection connector 224 on an upper surface 226 of the connector portion 222. As shown in FIG. 2, according to this embodiment, the cell monitor 220 including the connector portion 222 is formed in a rectangular parallelepiped shape that is wholly protruded upward from the first case 200. This configuration may be implemented by, for example, arranging a circuit board (not shown) with the circuit of the cell monitor 220 mounted thereon upright along a YZ plane.

The FC converter 310, the control device 320, the relay 330 (not shown in FIG. 2), the service plug unit 340 and the output wiring 370 of the high voltage circuit portion 30 are placed in the second case 300. The output connector 350 and the external communication connector 360 are provided on a cover surface 302 that is an upper surface of the second case 300. The second case 300 also includes an insertion space 308 that is provided in an internal space of the second case 300 other than the spaces to receive the FC converter 310, the control device 320 and the service plug unit 340 placed therein and is configured to receive insertion of the connector portion 222 of the cell monitor 220 protruded upward from the first case 200. Furthermore, a connector opening 306 is provided in the cover surface 302 of the second case 300 to be arranged above the connection connector 224 when the connector portion 222 is inserted into the insertion space 308. A plug opening 304 is also provided in the cover surface 302 of the second case 300 as an opening region corresponding to the location where the service plug unit 340 is to be placed. In the illustrated example of FIG. 2, the connector opening 306 is provided continuously with the plug opening 304. The communication cable 324 connected with the control device 320 is arranged through the plug opening 304 toward the connector opening 306. The communication connector 322 is provided on an end of the communication cable 324 to be connected with the connection connector 224.

The second case 300 is assembled with and fixed to the first case 200 shown by the left drawing of FIG. 2. The fuel cell 210, the cell monitor 220, the FC converter 310, the control device 320, the relay 330 (not shown in FIG. 2) and the service plug unit 340 are accordingly placed in a casing configured by assembling the first case 200 and the second case 300. This provides the integrated fuel cell unit 10 as shown by the right drawing of FIG. 2.

Figure 3:
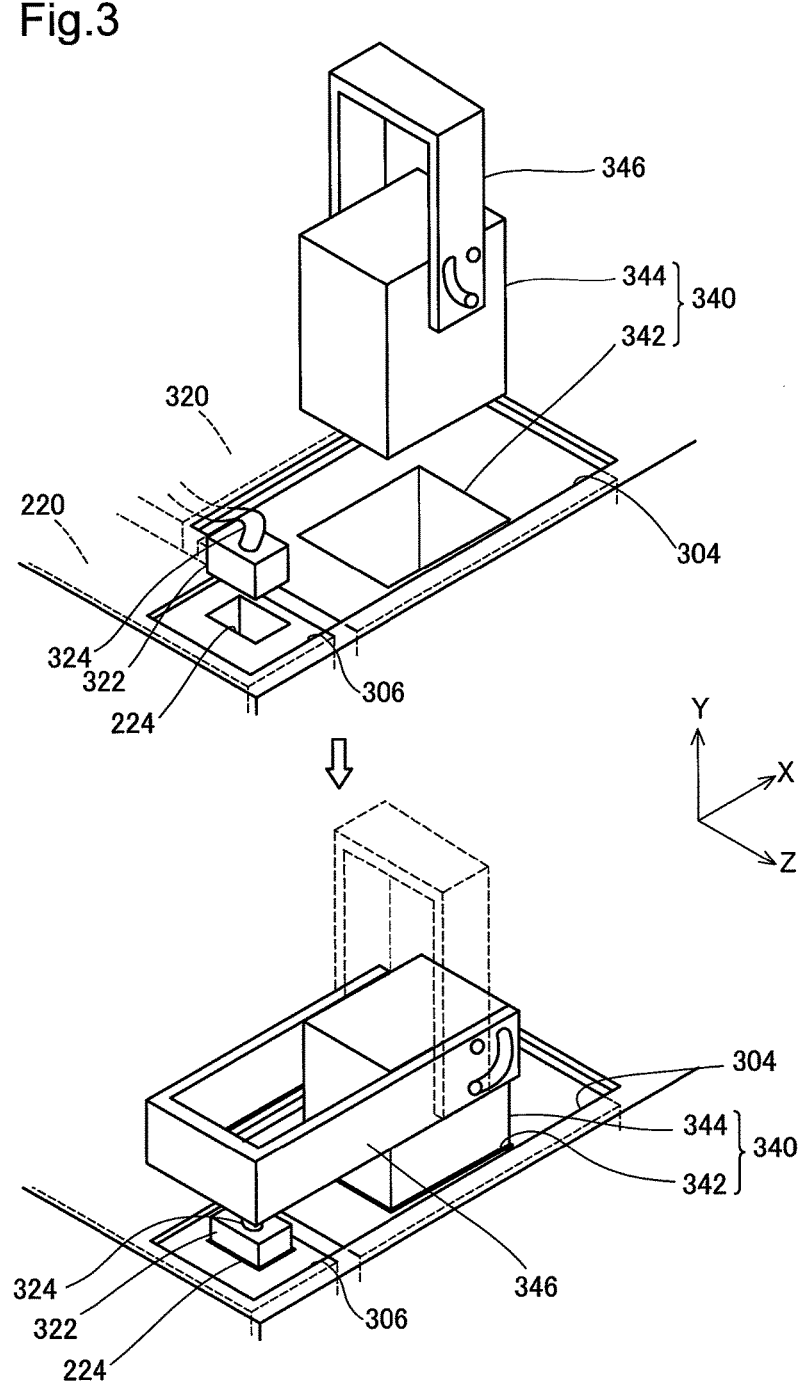
FIG. 3 is enlarged perspective views illustrating a plug opening and a connector opening of the fuel cell unit.

FIG. 3 is enlarged perspective views illustrating the plug opening 304 and the connector opening 306 of the fuel cell unit 10. As shown by the upper drawing of FIG. 3, the communication connector 322 provided on the end of the communication cable 324 is attached to the connection connector 224 of the cell monitor 220 placed below (on a −Y direction side) of the connector opening 306. This configuration enables the control device 320 and the cell monitor 220 to be readily connected with each other via the communication cable 324. This configuration accordingly enables the control device 320 to establish communication with the cell monitor 220 and obtain the results of monitoring the voltages of the respective cells 212 of the fuel cell 210 by the cell monitor 220.

The socket portion 342 of the service plug unit 340 is placed below the plug opening 304. The service plug portion 344 is configured to include a grip 346 that is rotated to change over between a locked position and an unlocked position. As shown by the lower drawing of FIG. 3, the operation of mounting the service plug portion 344 to the socket portion 342 and rotating and pressing down the grip 346 changes over the service plug portion 344 to the locked position such as to fix the service plug portion 344 and provides continuity between the output terminal of the FC converter 310 and the output connector 350. The operation of rotating and pulling up the grip 346 from the locked position, on the other hand, changes over the service plug unit 340 to the unlocked position (i.e., the state shown by the broken line in the drawing) such as to allow for detachment of the service plug unit 340. The operation of drawing the service plug portion 344 out of the socket portion 342 breaks the continuity between the output terminal of the FC converter 310 and the output connector 350.

As shown by the lower drawing of FIG. 3, when the service plug unit 340 is at the locked position, the connector opening 306 is placed below the grip 346 at the pressed-down position. More specifically, the connector opening 306 is placed in the dead space below the grip 346 at the pressed-down position when the service plug unit 340 is at the locked position. This configuration thus effectively uses the dead space to efficiently provide the connector opening 306 in the second case 300. This configuration also enables the plug opening 304 and the connector opening 306 to be provided collectively and efficiently in one place in the second case 300. The configuration that the plug opening 304 and the connector opening 306 are covered with and shielded by a cover (not shown) provides the waterproof property to the fuel cell unit 10.

As described above, in the fuel cell unit 10 described above, the fuel cell 210 is placed in the first case 200, and the control device 320 is placed in the second case 300. In the configuration without the connector opening 306 as described in BACKGROUND, there is a need to assemble the first case 200 with the second case 300 after the communication connector 322 of the communication cable 324 connected with the control device 320 is connected with the connection connector 224 of the cell monitor 220. This configuration increases the difficulty in assembling. The configuration of the fuel cell unit 10 described above, on the other hand, enables the communication connector 322 of the communication cable 324 to be readily connected with the connection connector 224 of the cell monitor 220 through the connector opening 306 of the second case 300 after the first case 200 is assembled with the second case 300. This configuration reduces the difficulty in assembling. Additionally, the control device 320 is placed in the second case 300 that is different from the first case 200 configured to place the fuel cell 210 therein. This configuration reduces the adverse effects of stresses by thermal expansion and thermal contraction of the fuel cell 210 on the control device 320.

Figure 4:
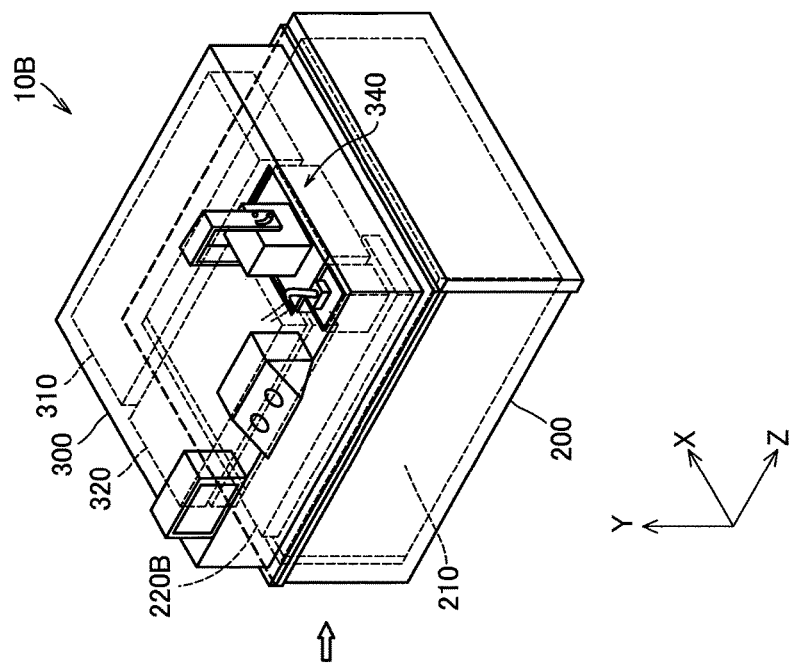
FIG. 4 is perspective views illustrating the configuration of a fuel cell unit according to a modification.
Figure 4:
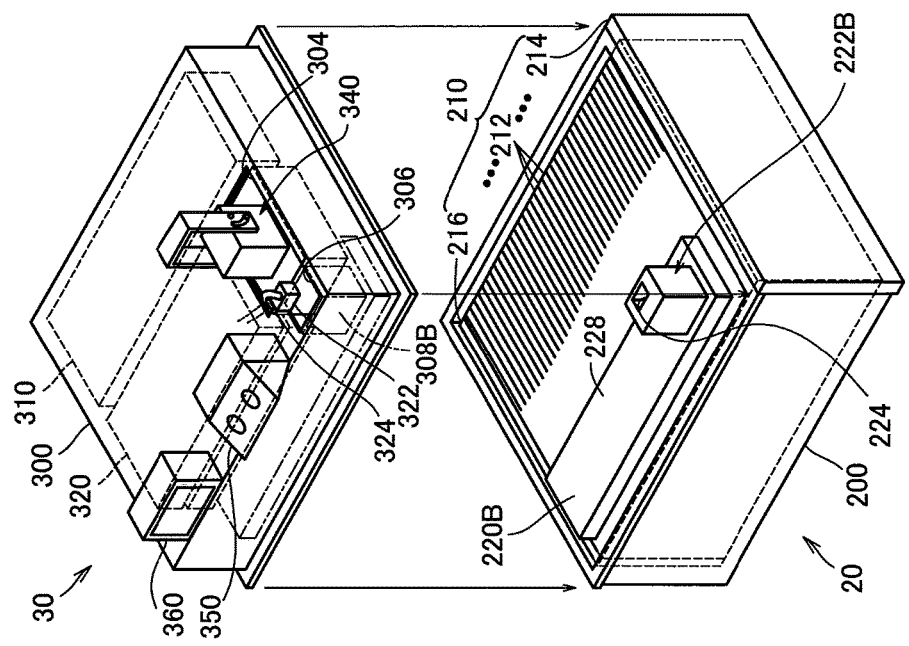

FIG. 4 is perspective views illustrating the configuration of a fuel cell unit 10B according to a modification. The fuel cell unit 10B of the modification is configured to include a cell monitor 220B and an insertion space 308B of the following configuration, in place of the cell monitor 220 and the insertion space 308 shown in FIG. 2.

In the fuel cell unit 10 shown in FIG. 2, the entire cell monitor 220 including the connector portion 222 is formed in a rectangular parallelepiped shape that is protruded upward from the first case 200. The insertion space 308 of the second case 300 is formed in a corresponding shape. In the fuel cell unit 10B of the modification, on the other hand, a connector portion 222B is configured to be protruded upward from a main body portion 228 of the cell monitor 220B. The insertion space 308B of the second case 300 is formed in a shape corresponding to the cell monitor 220B and the connector portion 222B.

Like the fuel cell unit 10 of the embodiment, the configuration of the fuel cell unit 10B of the modification enables the communication connector 322 of the communication cable 324 to be readily connected with a connection connector 224 of the cell monitor 220B through the connector opening 306 of the second case 300 after the first case 200 is assembled and integrated with the second case 300. Additionally, the control device 320 is placed in the second case 300. This configuration reduces the adverse effects of stresses by thermal expansion and thermal contraction of the fuel cell 210 on the control device 320.

The cell monitor 220 or 220B is configured to monitor the voltages of the respective cells in the embodiment and the modification described above but may be configured to monitor at least one of various parameters including, for example, voltages, electric currents and temperatures of the respective cells.

In the embodiment and the modification described above, the connector opening 306 is provided in the cover surface 302 of the second case 300 that is located above the connection connector 224. This configuration is, however, not essential. For example, according to a modification, the connection connector 224 may be configured to be opposed to a side face of the second case 300, and the connector opening 306 may be provided in this side face. In general, the second case may be configured to provide a connector opening in a surface opposed to the connection connector when the connector portion is inserted in the insertion space.

In the embodiment and the modification described above, the first case 200 is placed on the lower side, and the second case 300 is placed on the upper side. According to another modification, the first case 200 and the second case 300 may be placed in a reverse vertical arrangement or may be placed in a lateral arrangement.

In the embodiment and the modification described above, the connector opening 306 is provided continuously with the plug opening 304 and is placed below the position of the grip 346 (shown in FIG. 3) when the service plug unit 340 is at the locked position. This configuration is, however, not essential. According to a modification, the connector opening 306 may be provided to be away from the plug opening 306. According to another modification, the connector opening 306 may be provided at a different location from the location below the position of the grip 346 at the locked position.

In the embodiment and the modification described above, the control device 320 provided to control the FC converter 310 is connected with the cell monitor 220 or 220B via the communication cable 324. This configuration is, however, not essential. According to a modification, another control device different from the control device 320 provided to control the FC converter 310 may be placed in the second case 300 and may be connected with the cell monitor 220 or 220B via the communication cable 324.

The components provided in the fuel cell unit are not limited to the components shown in FIG. 1. The fuel cell unit may be configured to include at least a fuel cell, a cell monitor and a control device configured to establish communication with the cell monitor. Other various components may be provided additionally. In a configuration without the service plug unit, the plug opening may be omitted, and only the connector opening may be provided.

The disclosure is not limited to any of the embodiment and the modifications described above but may be implemented by a diversity of other configurations without departing from the scope of the disclosure. For example, the technical features of any of the embodiment and the modifications may be replaced or combined appropriately, in order to solve part or all of the problems described above or in order to achieve part or all of the advantageous effects described above. Any of the technical features may be omitted appropriately unless the technical feature is described as essential herein. The present disclosure may be implemented by aspects described below.

(1) According to one aspect of the disclosure, there is provided a fuel cell unit. This fuel cell unit comprises a fuel cell including a cell stack with a plurality of stacked cells; a cell monitor configured to monitor one or more of the plurality of stacked cells; a control device connected with the cell monitor via a communication cable; a first case configured to place the fuel cell therein; and a second case configured to place the control device therein and fixed to an upper surface of the first case. The cell monitor includes a connector portion protruded from the first case and provided with a connection connector configured to be connected with a communication connector of the communication cable. The second case includes an insertion space for receiving the connector portion inserted therein in a state that the second case is fixed to the first case and further includes a connector opening in a surface opposed to the connection connector in a state that the connector portion is inserted in the insertion space.

The configuration of the fuel cell unit of this aspect enables the communication connector of the communication cable that is provided to connect the cell monitor with the control device placed in the second case, to be readily connected with the connection connector provided in the connector portion of the cell monitor through the connector opening of the second case. Additionally, the control device is placed in the second case. This configuration reduces the adverse effects of stresses by thermal expansion and thermal contraction of the fuel cell placed in the first case on the control device.

(2) The fuel cell unit of above aspect may further comprise a service plug unit that includes: a socket portion connected with an output wiring provided in the second case; and a service plug portion detachably mounted to the socket portion for cutting off of an output of a voltage of the fuel cell to outside. The connector opening may be provided continuously with a plug opening for receiving the service plug portion in an upper surface of the second case.

The configuration of the fuel cell unit of this aspect enables the plug opening and the connector opening to be provided collectively and efficiently in one place in the second case.

(3) In the fuel cell unit of the above aspect, the service plug portion may include a grip configured to be rotated to change over between a locked position to fix the service plug portion to the socket portion and an unlocked position to allow for detachment of the service plug portion from the socket portion, the service plug portion being configured to be changed over to the locked position when the grip is rotated to be pressed down and to be changed over to the unlocked position when the grip is rotated from the locked position to be pulled up. The connector opening may be placed below the grip rotated to be pressed down in a state that the service plug portion is mounted to the socket portion and is changed over to the locked position.

A dead space that is generally not utilized is provided below the grip at the locked position. In the fuel cell unit of this aspect, the connector opening is provided at the position of the dead space. This configuration thus enables the connector opening to be efficiently provided in the second case.

The present disclosure may be implemented by various aspects other than the fuel cell unit described above, for example, a fuel cell vehicle equipped with the fuel cell unit or a fuel cell system including the fuel cell unit.

What is claimed is:

1. A fuel cell unit, comprising:
   a fuel cell including a cell stack with a plurality of stacked cells;
   a cell monitor configured to monitor one or more of the plurality of stacked cells;
   a control device connected with the cell monitor via a communication cable;
   a first case configured to place the fuel cell therein; and
   a second case configured to place the control device therein and fixed to an upper surface of the first case, wherein
   the cell monitor includes a connector portion protruded from the first case and provided with a connection connector configured to be connected with a communication connector of the communication cable, and
   the second case includes an insertion space for receiving the connector portion inserted therein in a state that the second case is fixed to the first case and further includes a connector opening in a surface opposed to the connection connector in a state that the connector portion is inserted in the insertion space.

2. The fuel cell unit according to claim 1, further comprising:
   a service plug unit that includes:
      a socket portion connected with an output wiring provided in the second case; and
      a service plug portion detachably mounted to the socket portion for cutting off of an output of a voltage of the fuel cell to outside, wherein
   the connector opening is provided continuously with a plug opening for receiving the service plug portion in an upper surface of the second case.

3. The fuel cell unit according to claim 2, wherein
   the service plug portion includes a grip configured to be rotated to change over between a locked position to fix the service plug portion to the socket portion and an unlocked position to allow for detachment of the service plug portion from the socket portion, the service plug portion being configured to be changed over to the locked position when the grip is rotated to be pressed down and to be changed over to the unlocked position when the grip is rotated from the locked position to be pulled up, and
   the connector opening is placed below the grip rotated to be pressed down in a state that the service plug portion is mounted to the socket portion and is changed over to the locked position.

* * * * *